United States Patent [19]

Foglino et al.

[11] 4,003,714
[45] Jan. 18, 1977

[54] DEVICE FOR CLOSING INLET AND OUTLET PORTS OF A TUNNEL AUTOCLAVE

[75] Inventors: Giorgio Foglino; Alfio Battain, both of Turin; Raffaello Cappucciati, Venaria (Turin), all of Italy

[73] Assignee: Superga S.p.A., Turin, Italy

[22] Filed: Oct. 24, 1975

[21] Appl. No.: 625,624

[30] Foreign Application Priority Data

Nov. 15, 1974 Italy .............................. 70349/74

[52] U.S. Cl. .............................. 23/290; 110/173 R; 214/18 R; 214/18 N; 104/94; 49/68; 49/70; 49/360; 266/249; 238/10 R; 238/12; 432/242; 432/250

[51] Int. Cl.² ................... B01J 3/02; E01B 11/42

[58] Field of Search .................. 23/290, 290.5; 110/173 R; 214/18 R, 18 N, 18 PH; 104/100, 91, 94, 89, 88; 266/4 R, 5 RH; 238/10 R, 12; 432/242, 250; 49/68, 70

[56] References Cited

UNITED STATES PATENTS

| 1,550,141 | 8/1925 | Bennington | 104/100 X |
| 3,266,644 | 8/1966 | Ipsen | 266/4 X |
| 3,298,546 | 1/1967 | Jones | 214/18 R |

Primary Examiner—James H. Tayman, Jr.
Attorney, Agent, or Firm—Sughrue, Rothwell, Mion, Zinn & Macpeak

[57] ABSTRACT

A tunnel autoclave having guillotine doors at opposite ends has sections of rail fixed to the said doors so as to be aligned with guide rails extending through the said autoclave when the doors are in the open position.

2 Claims, 4 Drawing Figures

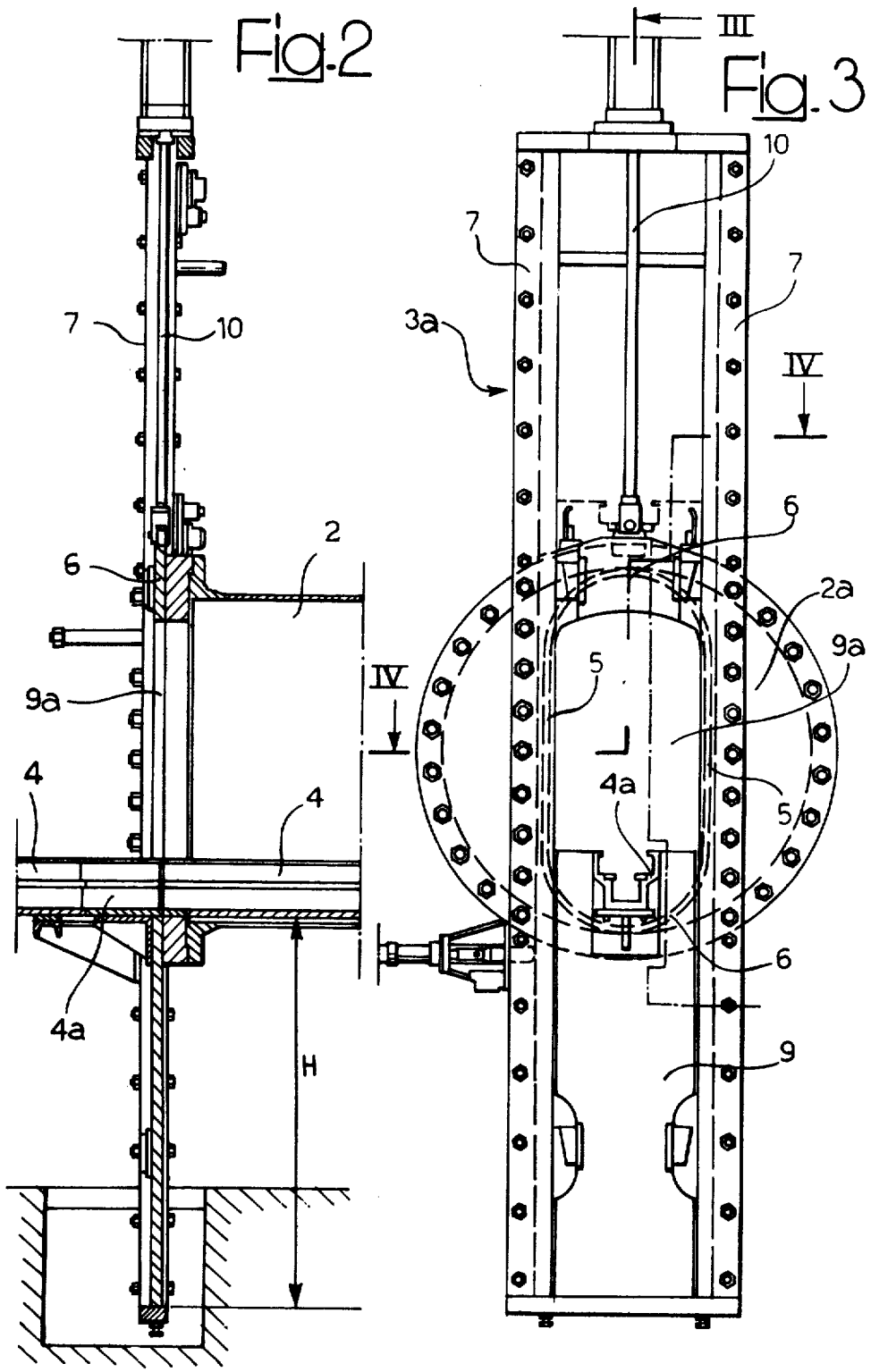

DEVICE FOR CLOSING INLET AND OUTLET PORTS OF A TUNNEL AUTOCLAVE

BACKGROUND OF THE INVENTION

This invention refers to tunnel autoclaves, that is, autoclaves of the type in which objects to be treated (for example rubber articles — such as boots — to be vulcanised) are fed, in groups and at predetermined intervals, into the interior of the autoclave by means of carriages sliding on at least one guide rail extending through the autoclave.

The presence of guide rails in a tunnel autoclave poses problems of sealing at the inlet and outlet ports of the autoclave.

A known solution described in French Pat. No. 1,339,618 is to provide vertically sliding guillotine doors for closing the inlet and outlet ports of the autoclave, so as to be pivotable in a vertical plane about horizontal axes outside the autoclave, so that they can be moved out of the paths of the doors when the latter are closed.

The pivoting of the rail sections is effected by means of a mechanism controlled, for example, by pneumatic or hydraulic actuators and synchronised with the mechanism controlling the doors so as to obtain correct operation.

The considerable practical difficulties involved in this combined mechanism give rise to a number of disadvantages among which is high cost.

The object of this invention is to provide a device which solves the problem of interference between a moving guillotine door and a guide rail while being extremely simple both in its construction and its operation.

SUMMARY OF THE INVENTION

According to the present invention there is provided a device for closing inlet and outlet ports at opposite ends of a tunnel autoclave into which articles are fed, in groups and at predetermined intervals, by means of carriages movable along at least one guide rail extending through the autoclave, each of the said inlet and outlet ports having assembled thereon a guillotine door, movable in synchronisation with a section of rail situated in the path of movement of the door, characterised in that the movable section of the guide rail is fixed to the door and is so positioned that when the door is in the open position, the said rail is aligned with the remaining portion of the guide rail.

BRIEF DESCRIPTION OF THE DRAWINGS

One embodiment of the present invention will now be particularly described, by way of example, with reference to the accompanying drawings, in which:

FIG. 2 is an axial section taken at one end of the autoclave, along the line III—III of FIG. 3;

FIG. 3 is a front view of one of the devices in its open position; and

DETAILED DESCRIPTION OF THE ILLUSTRATED EMBODIMENT

Figure 1:
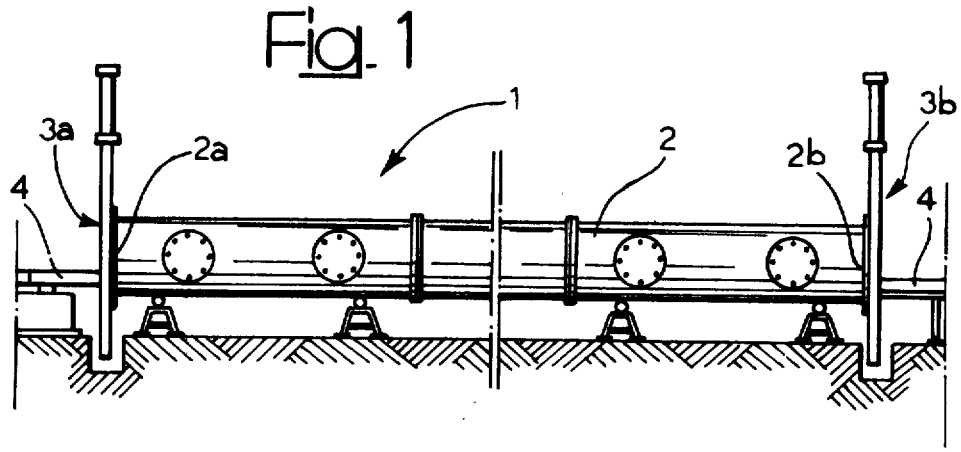
FIG. 1 is a diagrammatic view, in elevation, of a tunnel autoclave provided with a device according to the invention for controlling the opening and closing of the inlet and outlet ports of the autoclave.
Figure 4:
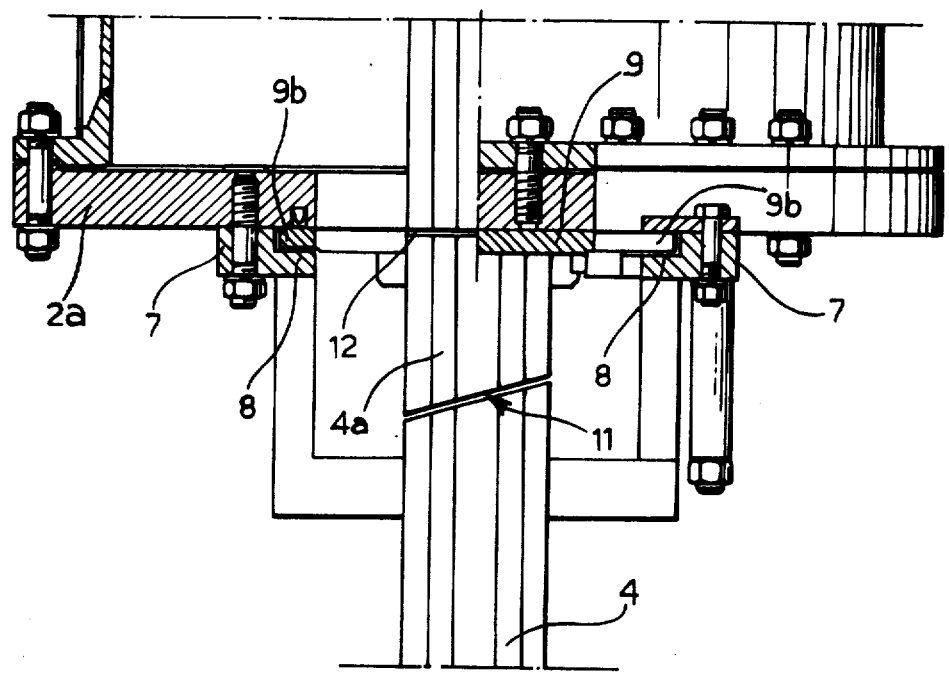
FIG. 4 is a cross section taken along the line IV—IV of FIG. 3.

FIG. 1 shows a tunnel autoclave 1 comprising a cylindrical body 2 with a horizontal axis, having end sections 2a and 2b which terminate in flanges surrounding inlet and outlet ports respectively of the autoclave. Each of these ports is provided with a closure device indicated generally by 3a and 3b respectively.

The cylindrical body 2 is traversed throughout its entire length by a groove of substantially T-shaped cross section which acts as a guide rail 4 upon which run carriages, not illustrated. The carriages are adapted to support rubber articles, for example rubber boots, to be vulcanised.

Since the closure devices 3a and 3b of the inlet and outlet ports respectively of the autoclave 1 are similar to each other, only the closure device 3a for closing and opening the inlet port of the said autoclave will be described in detail in the following description.

The inlet port of the autoclave, made in the end section 2a, is illustrated by a dashed line in FIG. 3 and is delimited laterally by two vertical rectilinear edges 5 interconnected by upper and lower arcuate edges 6. Adjacent each rectilinear edge 5 there is provided a guide 7, which is also rectilinear and parallel to the edges 5. Each guide 7 has cross-sectional profile in the form of a C-section channel 8 in which a corresponding lateral edge 9b of a slidable door 9 engages. Each door 9 consists of a substantially flat plate and has in its upper portion an aperture 9a of a shape similar to the inlet port described above and with a slightly narrower cross section than the latter. The aperture 9a together with the inlet port constitutes the inlet section of the autoclave 1. The door 9 is slidable between an extreme upper and an extreme lower position, and is raised and lowered by a mechanism, not shown, for example, a fluid pressure actuator, acting on a rod 10.

To the edge of the door 9 which delimits the lower edge of the aperture 9a there is affixed a section of rail 4a having a cross-sectional profile identical to that of the guide rail 4 and delimited by front and rear end planes 11 and 12 which are respectively inclined and perpendicular to the longitudinal axis of the rail section 4a.

In FIG. 2 the door is illustrated in its extreme lower position and in this condition the section of rail 4a is substantially aligned with the guide rail 4 which passes through the autoclave 1. In this situation, which corresponds to the open state of the autoclave 1, the carriages can run on the guide rail 4 and, via the section of rail 4a, penetrate into the interior of the autoclave 1. The portion of door 9 which is below the section of rail 4a has no openings and is of a height H at least equal to the maximum height of the inlet port of the autoclave 1, as defined by the arcuate edges 6. Thus, when the door 9, starting from the position shown in FIG. 2, is raised into its extreme upper position, the solid portion of the door is brought into a position adjacent the inlet port and the inlet port is then completely cut off, which ensures perfect closure of the autoclave. This device thus provides a simple means of opening and closing the autoclave 1 and simultaneously moving the section of rail 4a, by virtue of the mounting rail section 4a on the door so that both are moved in a single movement.

It will be appreciated that without changing the principle of the invention practical embodiments and details of construction may be varied widely from what has been described and illustrated by way of example, without going beyond the scope of this invention.

What is claimed is:

1. In a tunnel autoclave having inlet and outlet ports at opposite ends, at least one guide rail extending through said autoclave and carriages movable along said rail in groups at predetermined intervals for the transportation of articles through said autoclave, respective guillotine doors assembled on said inlet and outlet ports, each of said guillotine doors comprising a first part having a size at least complementary to the size of the respective port and a second part having an opening for the passage of said carriages, said rail having a fixed portion within said autoclave and a movable portion fixed to said second part of said door adjacent an edge portion of the opening therein, each door being movable between an open position in which the opening of said second part of said door is aligned with a corresponding port of the autoclave and the movable portion of said rail is aligned with the fixed portion of said rail and a closed position in which the first part of said door is aligned with the corresponding port of said autoclave.

2. In a tunnel autoclave as set forth in claim 1 further comprising rectilinear guide means in the form of a C-shaped channel disposed adjacent opposed lateral edges of each of said autoclave ports, each movable door having two lateral edges slidably engaged in said guide means.

* * * * *